Patented Sept. 11, 1945

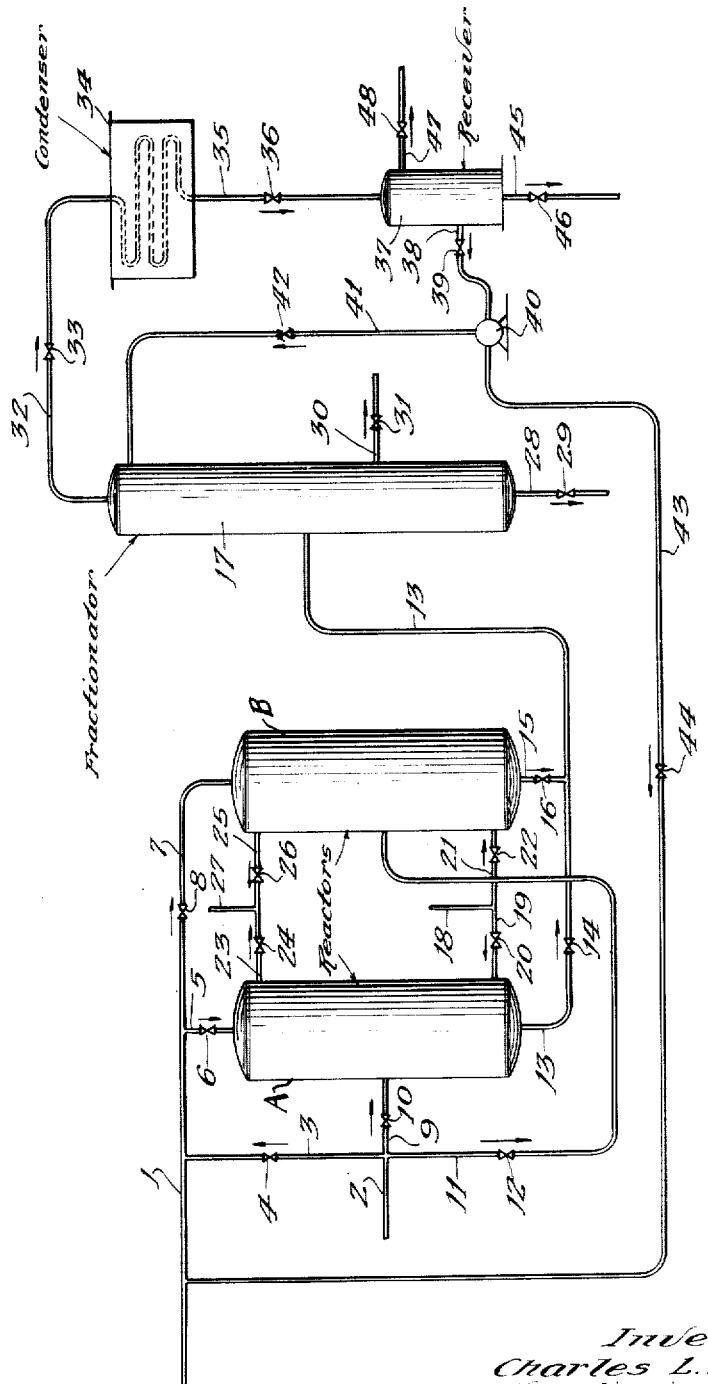

2,384,505

UNITED STATES PATENT OFFICE 2,384,505

TREATMENT OF HYDROCARBONS

Charles L. Thomas and Vladimir Haensel, Chicago, Ill., assignors to Universal Oil Products Company, Chicago, Ill., a corporation of Delaware Application August 14, 1942, Serial No. 454,834

14 Claims. (Cl. 260—671)

This is a continuation-in-part of our co-pending application Serial No. 257,464, filed February 20, 1939.

This invention relates to the manufacture of alkylated aromatic hydrocarbons, and in a more specific sense has reference to a process of contacting aromatic hydrocarbon with alcohols in the presence of specific catalysts under specific operating conditions.

The invention is characterized by the reaction of aromatics with alcohols, the use of silica-base type catalysts, and specific temperature time and pressure conditions of operation. In addition, the present invention includes a number of other features which will be hereinafter set forth in detail.

It has heretofore been suggested that aromatic hydrocarbons may be reacted with alcohols to produce alkylated aromatics. For example, in United States Patent No. 1,908,190, broad statements are made that this reaction may be effected in the presence of catalysts containing silica and alumina. However, the examples cited in the above patent are directed to the reaction of benzene with cyclohexanol and benzyl alcohol and the reaction of phenol and aniline with methyl alcohol. In these examples the time of contact varies from 6 hours to 15 hours. Times of contact of 6 hours or more are impractical for commercial use in continuous operations. Obviously the examples cited above are based on batch operations and do not teach a continuous process for commercial operation. It is an object of the present invention to shorten the reaction time so as to provide a continuous process for accomplishing these results, which process may be readily adapted to commercial operations.

As a feature of the invention, the times of contact employed are less than 15 minutes. By contact time, as used in the present specification and claims, is meant the residence time of the reactants in the reaction zone when calculated on the basis of an empty vessel under the conditions of operation prevailing therein. Usually the contact time will be less than 15 minutes, but as an essential feature of this invention, the contact time will never exceed 15 minutes.

In addition to the above features, the invention discloses the feature of utilizing an excess of aromatics in the reaction zone. This operation has a number of advantages, the primary ones being (1) conducting the reactions under substantially adiabatic conditions and (2) dissolving the unconverted ethylene in the aromatics for recycling. These and other advantages of this particular method of operation will be hereinafter described in detail.

It is believed that in the reaction of alcohols with aromatics, the alcohols are first dehydrated under the conditions of operation to yield water and olefins, and that the aromatics are then alkylated by the olefins. A particular advantage in the use of alcohols as one of the reactants is that the dehydration reaction is endothermic and absorbs heat, while the alkylation reaction is exothermic and liberates heat. Thus, the heat liberated by the exothermic alkylation reaction is utilized in the endothermic dehydration reaction, and this effects an efficient thermal system and, at the same time, also aids in permitting the production of alkylated aromatics to be effected under substantially adiabatic conditions.

Likewise, by operating according to the teachings of the present invention, the yields of desired mono-alkylated products are increased and the production of undesired higher boiling poly-alkylated aromatics are reduced to a minimum.

In one specific embodiment the present invention relates to a continuous process for producing alkylated aromatics which comprises reacting an aromatic with an alcohol in the presence of a catalyst containing silica and alumina for a time of contact of less than 15 minutes.

The catalysts employed in the present process are of the silica base type and comprise composites of silica and one or more metal oxides, such as alumina, zirconia, thoria, magnesia, etc. The catalyst may be of natural origin and includes such substances as clays, bleaching earths, kaolins, montmorillonites, bentonites, feldspars, etc., which may or may not be activated by treatment with acid or otherwise. The preferred catalysts are, however, of synthetic origin and may be prepared by a number of alternative methods to be hereinafter described in detail. The synthetically prepared catalysts have higher activity than the naturally occurring catalyst and, in addition, the synthetically prepared catalysts are more stable under the higher temperatures encountered during the regeneration thereof. It is understood, however, that the various catalysts, either of natural or synthetic origin, which may be employed in accordance with the present invention are not necessarily equivalent in their activity.

According to one general method, the preferred synthetic catalyst may be prepared by precipitating silica from solution as a hydrogel and subsequently admixing or depositing the hydrogels of alumina, zirconia, and/or thoria upon the hydrated silica. One of the more convenient methods of preparing the silica hydrogel is to acidify an aqueous solution of sodium silicate by the addition of an acid, such as hydrochloric acid, for example. The excess acid and the concentration of the solution in which the precipitation is brought about determine in some measure the suitability of the silica hydrogel for subsequent deposition of the hydrogels of alumina, zirconia, and/or thoria. In general, suitable hydrated silica may be produced by the use of dilute solutions of sodium silicate and the addition of a moderate excess of acid whereby the desired active silica gel is obtained and conditions of filtering and washing are at an optimum.

After precipitating the silica hydrogel, it is treated and washed to substantially remove alkali metal ions. It is not known whether the alkali metal ions, such as sodium ions, are present in the primary gel in chemical combination or in an adsorbed state, but it has been determined definitely taht their removal is necessary if catalysts are to be obtained suitable for prolonged use in accelerating hydrocarbon conversion reaction of the present character. It is possible that the presence of the alkali metal impurities causes a sintering or fluxing of the surfaces of the catalyst at elevated temperatures so that the porosity is much reduced with corresponding reduction in effective surface. Alkali metal ions may be removed by treating with solutions of acidic materials, ammonium salts, or salts of aluminum, zirconium, and/or thorium. When treating with acids, as for example with hydrochloric acid, the acid extracts the alkali metal impurities in the silica gel. The salts formed and acid are then substantially completely removed by water washing treatment. Where ammonium salts, or salts of aluminum, zirconium, and/or thorium are used, the ammonium or multivalent metals used apparently displace the alkali metal impurities present in the composite and the alkali metal salts formed, together with the major portion of the multivalent salts, are removed in the water washing treatment. Some of the multivalent metals introduced into the silica hydrogel in the purifying treatment may become a permanent part of the composite, whereas in the treatment with ammonium salts small amounts of the ammonium salts remaining after the washing process will be driven off in subsequent treatment at elevated temperatures.

In one of the preferred methods of compositing the hydrogel materials, the purified precipitated hydrated silica gel may be suspended in a solution of aluminum, zirconium, and/or thorium salts in the desired proportion and the alumina, zirconia, and/or thoria hydrogel deposited upon the suspended silica hydrogel by the addition of volatile basic precipitants, such as ammonium hydroxide, ammonium carbonate, ammonium hydrosulfide, ammonium sulfide, or other materials such as organic bases may be employed. According to this method, the purified silica gel may be suspended in a solution of aluminum chloride, zirconyl nitrate, and/or thorium nitrate, for example, and the hydrated alumina, zirconia, and/or thoria precipitated by the addition of ammonium hydroxide. In this example, the alumina, zirconia, and/or thoria are co-precipitated.

Alternatively the purified silica gel may be mixed while in the wet condition with separately prepared hydrated alumina, hydrated zirconia, and/or hydrated thoria precipitated either separately or concurrently, as for example by the addition of volatile basic precipitants to solutions of aluminum, zirconium, and/or thorium salts. The hydrated alumina, hydrated zirconia, and/or hydrated thoria thus prepared are substantially free from alkali metal ions and can be mixed with purified silica gel. However, if alkali metal ions are incorporated as when the hydrated alumina is prepared from sodium aluminate, for example, or if zirconium and/or thorium tetrahydroxides are precipitated by the interaction of zirconyl nitrate and/or thorium nitrate and sodium hydroxide, regulated purification treatment and water washing, by methods selected from those described in connection with the purification of hydrated silica gel to remove alkali metal ions, will be required. Care should be observed in the selection and concentration of reagents used so as not to dissolve unduly large amounts of alumina, zirconia, and/or thoria.

As further alternatives in the preparation of silica-base alkylation catalysts, purified silica gel may be added to a solution of salts of aluminum, zirconium, and/or thorium and hydrated alumina, hydrated zirconia, and/or hydrated thoria deposited by hydrolysis with or without the use of heat, or the purified silica gel may be mixed with suitable amounts of salts of aluminum, zirconium, and/or thorium, as, for example, to form a paste and heated whereby alumina, zirconia, and/or thoria are deposited upon the silica gel as a result of the decomposition of the alumina, zirconia, and/or thorium salts.

In the methods above described, a silica hydrogel free from alkali metal ions was admixed or had deposited thereon relatively pure hydrated alumina, hydrated zirconia, and/or hydrated thoria prior to the drying treatment. In methods described below, the hydrated silica with a hydrated alumina, hydrated zirconia, and/or hydrated thoria are concurrently precipitated or admixed and treated to remove the alkali metal ions from the composited material prior to drying treatment, either in the presence of the original reactants or subsequent to water washing. Thus, solutions of silicon compounds, more usually alkali metal silicates and soluble aluminum, zirconium, and/or thorium salts may be mixed under regulated conditions of acidity or basicity to jointly precipitate hydrated silica, hydrated alumina, hydrated zirconia, and/or hydrated thoria in varying proportions. For example, solutions of sodium silicate, aluminium chloride, zirconyl nitrate, and/or thorium nitrate may be mixed and an alkaline or acid reagent added according to the proportions used so that in the mix a pH in the range of 3–10 is obtained. In cases where a sol is formed, the precipitation may be brought about if the sol is acid by the addition of a volatile base, as for example, ammonium hydroxide, and alkali metal salts removed by water washing, or the composite may be treated as indicated above in connection with the purification of the hydrated silica to remove alkali metal ions. Various methods are possible for the preparation of the hydrated silica, hydrated alumina, hydrated zirconia, and/or hydrated thoria separately or in combination and the purifying treatment is always necessary where alkali metal ions are present in substantial mounts.

The character and efficiency of the ultimately prepared silica catalyst supports will vary more or less with precipitation and/or mixing, purification treatment, ratio of components, calcining, etc. The ratio of the components may be varied within wide limits, the limiting factor being more in evidence with respect to small proportions than with large proportions of the various components. In general, it appears that 2-6 mole per cent of alumina, zirconia, and/or thoria together with reference to silica may be considered an approximation of the minimum proportions.

After the alumina, zirconia, and/or thoria have been mixed with or deposited on the purified silica gel and water washed, if desired, as described for one general method of preparation, or after the hydrated silica, hydrated alumina, hydrated zirconia, and/or hydrated thoria have been composited and treated to remove the alkali metal ions, as described for another general method of preparation, the catalytic materials may be recovered as a filter cake and dried at a temperature in the order of 240-300° F., more or less, after which they may be formed into particles of a suitable average definite size ranging from powder to various forms and sizes obtained by pressing and screening, or otherwise formed into desirable shapes by compression or extrusion methods.

By calcining at temperature of the order of approximately 850-1000° F., or higher, the maximum activity of the silica-base alkylation catalyst is obtained and a further dehydration occurs so that, for example, after a considerable period of heating at 900° F., the water content, as determined by analysis, is of the order of 2-3%.

The methods of preparing the catalyst, as heretofore described, are preferred in connection with catalysts containing silica and alumina, silica and zirconia, silica and thoria, or mixtures thereof. However, when preparing catalysts containing silica and magnesia, a preferred method of operation is to prepare the silica hydrogel in any of the manners heretofore described and then composite it with magnesia by milling the magnesia into the silica hydrogel. If other metal oxides are also to be incorporated in the composite catalyst, the other metal oxide may be added by one of the methods outlined above either before or after the addition of magnesia.

Silica-base alkylating catalysts prepared by the various types of procedures outlined above evidently possess large total contact surfaces corresponding to a desirable porosity, the pores of the catalyst particles being of such size and shape that they do not become clogged with carbonaceous deposit after a long period of service and are, therefore, not difficult to reactivate by oxidation. This structure is retained, also, after many alternate periods of use and reactivation, as evidenced by the fact that the catalysts may be reactivated rapidly by passing air or other oxidizing gas over the used particles to burn off the deposits of carbonaceous materials at temperatures above 800° F., temperatures as high as 1400-1600° F., having been reached without apparently effecting the catalytic activity.

The pressures used in the present process are within the broad range of from 200 to 2000 pounds, or more, per square inch and preferably are within the range of from 250 to 900 pounds per square inch. The time of contact, as heretofore mentioned, is less than 15 minutes. If times of contact above 15 minutes are employed, cracking or other decomposition reactions occur with the formation of excessive gas and carbon. The carbon inactivates the catalyst and thus shortens the permissible process cycle. Further, the use of higher contact times reduces the yield of the desired mono-alkylated products and increases the yield of undesired higher boiling polyalkylated products.

The exact temperatures to be employed depends primarily upon the type of alcohol utilized in the process. In general, the primary alcohols are more difficult to react than are the secondary alcohols, and the secondary alcohols are more difficult to react than are the tertiary alcohols. To compensate for this property of the alcohols, the temperature to be employed in the present process is adjusted accordingly. For example, when using primary alcohols the temperature to be employed should be within the range of from about 500° F. to about 850° F. When using secondary alcohols the temperature should be within the range of from about 400° F. to about 750° F. When employing tertiary alcohols the temperatures should be within the range of from about 300° F. to about 650° F.

The alcohol and aromatic utilized in the present invention need not be of 100% purity but may contain other compounds in admixture therewith. In general, however, if it is desired to obtain a particular alkylated product, certain compounds should be excluded. For example, if it is desired to produce mono-ethylbenzene, the alcohol fraction utilized should not contain propyl, butyl, or higher boiling alcohols, nor should it contain propylene, butylene, or higher boiling olefins. Since the higher boiling alcohols and olefins react more readily than the ethyl alcohol, the product will contain such higher boiling alkylated aromatics which are not desired in the particular operation. However, as a general statement, more efficient operation is obtained when utilizing reactant fractions of higher purity.

As heretofore mentioned, the alcohol probably undergoes dehydration to water and olefin. Substantially complete dehydration of the alcohol is effected under the conditions of operation and the effluent from the reaction zone does not contain any alcohol. However, the products may contain some unconverted olefins which have not reacted with the aromatics, and as a particular feature of the present invention, the unreacted olefins are dissolved in the aromatics and are recycled to the reaction zone for further conversion therein. This method of operation is particularly advantageous when lower boiling alcohols are utilized as, for example, ethyl alcohol. When using ethyl alcohol, the reaction products will contain some ethylene, and by dissolving the ethylene in the aromatics for recycling, the use of expensive compressors or the like to recycle the ethylene is eliminated, since the ethylene dissolved in the benzene may be readily pumped back to the reaction zone for further conversion therein.

The molal ratio of benzene to alcohol introduced from an outside source and recycled olefin should be within the range of from about 2:1 to about 20:1, and preferably within the range of from about 4:1 to about 16:1. This molal ratio should not be less than about 2:1 since some of the advantages of the present invention are not obtained with lower proportions of benzene to alcohol and olefin. On the other hand, the use of molal ratios to alcohol and recycled olefin in excess of 20:1 produces no additional benefit but instead increases the size and cost of plant equipment beyond practical proportions.

As to the method of operation, a particularly suitable method is to dispose the catalyst in one or more reaction zones and to pass the aromatics and alcohols in contact therewith under the desired temperature, pressure, and time. This is of the type known as fixed bed and is a familiar method of operation. The reaction zones should likewise contain provision for introducing and removing an oxygen-containing gas so that, when the activity of the catalyst becomes spent beyond a practical extent, the oxygen-containing gas may be introduced thereto under the proper conditions of operation to effect combustion and removal of the deposits on the catalyst. In commercial operations at least two chambers are employed, one chamber being utilized for conducting the process reaction while the catalyst in the other chamber is at the same time undergoing regeneration.

In commercial operations it is also the practice to utilize some sort of timing mechanism whereby switching of the zone of process and the zone of catalyst regeneration may be effected automatically. The length of the process cycle, that is the time a bed of catalyst is utilized for processing prior to regeneration, will depend upon the amount of carbon and other material deposited on the catalysts, which, in turn, will depend upon the particular aromatics and alcohols being processed.

It is also within the scope of the invention, when desired, to introduce the alcohol from an extraneous source and/or the olefin dissolved in the aromatic fraction at one or a plurality of intermediate points in the reaction zone. The use of this procedure will depend upon the ratio of olefins to aromatics utilized in any particular operation, and in certain cases may have the advantage of minimizing olefin polymerization reactions.

Another type of operation which may be utilized commercially is that now known in the art as fluid operation. In this method of operation the catalyst in finely divided condition is carried into a reaction zone by means of one or more of the reactants. The flow in the reaction zone is so controlled that the converted and unconverted reactants pass into and through the reaction zone at a faster rate than does the catalyst. In this type of operation usually two zones are employed so that one may be utilized for effecting the conversion, while the other zone may be utilized for effecting regeneration of the catalyst. The partially used catalyst is withdrawn from the one reaction zone and carried by means of the regenerating gases into the other reaction zone wherein regeneration of the catalyst is effected under the properly controlled conditions.

The effluent from the reaction zone will consist primarily of the desired alkylated aromatics, some higher boiling aromatic compounds, and unreacted aromatics and olefins. The products may be introduced to one or more fractionating or separating zones whereby the desired alkylated aromatics may be separated and recovered. Likewise, the higher boiling aromatics are also separated and recovered for any desired use. The excess aromatics and unreacted olefin are usually withdrawn as an overhead product from the fractionating zone and are condensed under conditions to dissolve substantially all of the unreacted olefin in the aromatic. The exact temperature of cooling will vary with the particular aromatic and olefin utilized but, in general, the temperature will be substantially that of atmospheric or slightly below. Due to the high excess of aromatic hydrocarbons and to the high pressures utilized in the process, the unreacted olefin may be readily dissolved in the aromatics. The aromatic hydrocarbons containing the dissolved olefin may then be readily pumped back to the reaction zone for further conversion therein.

One method of conducting our process is illustrated in the accompanying diagrammatic drawing which is introduced for the purpose of further illustrating the novelty and utility of the present invention but not with the intention of unduly limiting the same.

Referring to the drawing, reactors A and B each contain a bed of alkylation catalyst disposed therein. Usually one of these reactors will be employed for effecting the alkylation reaction, while the catalyst in the other reactor is being regenerated. Although two such reactors are shown in the drawing, it is understood that one or three or more of such reactors may be employed within the scope of the present invention.

The aromatic hydrocarbon at a suitable temperature and pressure, may be introduced to the process through line 1, while the alcohol, likewise at a suitable temperature and pressure, may be introduced through line 2 and directed through line 3 containing valve 4 into line 1. The commingled charge may then be directed either through line 5 containing valve 6 to reactor A or through line 7 containing valve 8 to reactor B, depending upon which reactor is being employed for effecting the alkylation reaction. When desired, a portion of the alcohol charging stock may be directed through line 9 containing valve 10 to a mid-portion in reactor A or through line 11 containing valve 12 to a mid-portion in reactor B, again depending upon which reactor is being utilized for effecting the alkylation reaction. The reaction products are withdrawn either from reactor A through line 13 containing valve 14, or from reactor B through line 15 containing valve 16, as the case may be, and then are directed through line 13 into fractionator 17.

While the reactants are being supplied to one reactor, a suitable oxygen-containing gas is supplied to the other reactor in order to effect regeneration of the catalyst. The oxygen-containing gas is introduced through line 18 and may be directed through line 19 containing valve 20 into reactor A or through line 21 containing valve 22 into reactor B. The combustion products may be removed from reactor A through line 23 containing valve 24 or from reactor B through line 25 containing valve 26, and may be withdrawn from the process through line 27.

Fractionator 17 may comprise one or a plurality of suitable fractionating, distilling, absorption and stripping zones, in order to separate the alkylation products into the desired fractions. Higher boiling alkylation products may be withdrawn from zone 17 through line 28 and valve 29. The desired alkylation product may be withdrawn from zone 17 through line 30 containing valve 31.

The overhead fraction from zone 17 will comprise principally unreacted olefin and aromatic, as well as water formed by the dehydration of the alcohol in zones A and B. This fraction may be directed through line 32 containing valve 33 into and through condenser 34, and the cooled products may be directed through line 35 containing valve 36 into receiver 37. As heretofore set forth, the pressure maintained in receiver 37 is preferably sufficiently high so that the olefin will be dissolved in the large excess of aromatic hydrocarbon employed. The aromatic containing dissolved olefin may be withdrawn from receiver 37 through line 38 containing valve 39 to pump 40, by means of which a portion thereof may be recycled by way of line 41 containing valve 42 to the upper portion of fractionator 11 to serve as a cooling and refluxing medium therein, while the remaining portion of aromatic and olefin may be directed through line 43 containing valve 44 into line 1, whereby it is supplied in the manner heretofore set forth.

Water may be drained from receiver 37 through line 45 containing valve 46. Receiver 37 is also provided with conventional gas release line 47 containing valve 48.

The present invention is particularly applicable to the alkylation of benzene with ethyl alcohol to produce mono-ethylbenzene. By operating in accordance with the teachings herein, increased yields of mono-ethylbenzene are obtainable. The ethylbenzene may be dehydrogenated to produce styrene, which styrene may be utilized as one of the reactants in the preparation of synthetic rubber.

The following example of one operation is given for the purpose of further illustrating the invention but not with the intention of unduly limiting the same.

This example relates to the reaction of benzene with ethyl alcohol in the presence of a fixed bed of catalyst comprising silica and alumina at a temperature of 700° F. under a pressure of 900 pounds per square inch. The ratio of benzene to ethyl alcohol and recycled ethylene is 10:1. The time of contact is 3.4 minutes. The effluent from the reaction zone comprises mono-ethylbenzene, higher boiling poly-ethylated benzene, unreacted benzene, and ethylene. The benzene and ethylene are cooled to atmospheric temperature and are condensed under a pressure of 600 pounds per square inch. The benzene, containing dissolved ethylene, is recycled to the reaction zone for further conversion therein. Water is present in the alkylated products and is separated therefrom.

We claim as our invention:

1. A process for producing substantial yields of alkylated aromatic hydrocarbons which comprises subjecting aromatic hydrocarbons and alcohols to contact with a composite catalyst comprising precipitated silica and alumina for a time of contact of not more than 15 minutes.

2. A process for producing mono-ethylbenzene which comprises subjecting benzene and ethyl alcohol to contact with a composite catalyst comprising precipitated silica and precipitated alumina for a time of contact of not more than 15 minutes.

3. A process for producing substantial yields of alkylated aromatic hydrocarbons which comprises subjecting aromatic hydrocarbons and a primary alcohol to contact with a composite catalyst containing precipitated silica and alumina at a temperature of from about 500° F. to about 850° F. for a time of contact of not more than 15 minutes.

4. A process for producing substantial yields of alkylated aromatic hydrocarbons which comprises subjecting aromatic hydrocarbons and a secondary alcohol to contact with a composite catalyst containing precipitated silica and alumina at a temperature of from about 400° F. to about 750° F. for a time of contact of not more than 15 minutes.

5. A process for producing substantial yields of alkylated aromatic hydrocarbons which comprises subjecting aromatic hydrocarbons and a tertiary alcohol to contact with a composite catalyst containing precipitated silica and alumina at a temperature of from about 300° F. to about 650° F. for a time of contact of not more than 15 minutes.

6. A process for producing substantial yields of alkylated aromatic hydrocarbons which comprises subjecting aromatic hydrocarbons and a primary alcohol to contact with a composite catalyst containing precipitated silica and precipitated alumina at a temperature of from about 500° F. to about 850° F. under a pressure of from about 200 to about 2000 pounds per square inch for a time of contact of not more than 15 minutes.

7. A process for producing substantial yields of alkylated aromatic hydrocarbons which comprises subjecting aromatic hydrocarbons and a secondary alcohol to contact with a composite catalyst containing precipitated silica and precipitated alumina at a temperature of from about 400° F. to about 750° F. under a pressure of from about 200 to about 2000 pounds per square inch for a time of contact of not more than 15 minutes.

8. A process for producing substantial yields of alkylated aromatic hydrocarbons which comprises subjecting aromatic hydrocarbons and a tertiary alcohol to contact with a composite catalyst containing precipitated silica and precipitated alumina at a temperature of from about 300° F. to about 650° F. under a pressure of from about 200 to about 2000 pounds per square inch for a time of contact of not more than 15 minutes.

9. A process for producing substantial yields of alkylated aromatic hydrocarbons which comprises subjecting aromatic hydrocarbons and alcohols to contact with a synthetically prepared composite mass of silica and an oxide selected from the group consisting of alumina, zirconia, magnesia and thoria for a time of contact of not more than 15 minutes.

10. A process for producing mono-ethylbenzene which comprises subjecting one molecular proportion of ethyl alcohol and from about 2 to about 20 molecular proportions of benzene to contact with a composite catalyst comprising alumina and precipitated silica at a temperature of from about 500° F. to about 850° F. under a pressure of from about 200 to about 2000 pounds per square inch for a time of contact of not more than 15 minutes.

11. A process for the production of mono-ethylbenzene which comprises reacting benzene, ethyl alcohol, and ethylene at a temperature of from about 500° F. to about 850° F. under a pressure of from about 200 to about 2000 pounds per square inch for a time of contact of not more than 15 minutes in the presence of a composite catalyst comprising alumina and precipitated silica in a reaction zone, said reaction comprising dehydration of the ethyl alcohol to water and ethylene and alkylation of the benzene by ethylene, separating the reaction products into alkylated benzene and unreacted ethylene and benzene under a pressure of from about 200 pounds to about 2000 pounds per square inch in order to dissolve said unreacted ethylene in said benzene, and recycling said benzene and dissolved ethylene to the reaction zone for further conversion therein, the ratio of benzene to ethylene in said reaction zone being two to twenty molecular proportions of benzene to one molecular proportion of ethyl alcohol and ethylene.

12. A synthesizing process which comprises reacting an aromatic hydrocarbon with an alcohol under reaction conditions in the presence of a precipitated silica catalyst.

13. A synthesizing process which comprises reacting an aromatic hydrocarbon with an alcohol under reaction conditions in the presence of a catalyst comprising precipitated silica and a metal oxide selected from the group consisting of alumina, zirconia, thoria and magnesia.

14. A process for synthesizing hydrocarbons which comprises reacting an aromatic hydrocarbon with an alcohol under reaction conditions in the presence of a composite catalyst comprising precipitated silica and a metal oxide selected from the group consisting of alumina, zirconia, thoria and magnesia.

CHARLES L. THOMAS.
VLADIMIR HAENSEL.

Disclaimer 2,384,505.—*Charles L. Thomas* and *Vladimir Haensel*, Chicago, Ill. TREATMENT OF HYDROCARBONS. Patent dated Sept. 11, 1945. Disclaimer filed Dec. 7, 1949, by the assignee, *Universal Oil Products Company*.
Hereby enters this disclaimer to claim 1 of said patent.
[*Official Gazette January 17, 1950.*]

12. A synthesizing process which comprises reacting an aromatic hydrocarbon with an alcohol under reaction conditions in the presence of a precipitated silica catalyst.

13. A synthesizing process which comprises reacting an aromatic hydrocarbon with an alcohol under reaction conditions in the presence of a catalyst comprising precipitated silica and a metal oxide selected from the group consisting of alumina, zirconia, thoria and magnesia.

14. A process for synthesizing hydrocarbons which comprises reacting an aromatic hydrocarbon with an alcohol under reaction conditions in the presence of a composite catalyst comprising precipitated silica and a metal oxide selected from the group consisting of alumina, zirconia, thoria and magnesia.

CHARLES L. THOMAS.
VLADIMIR HAENSEL.

Disclaimer 2,384,505.—*Charles L. Thomas* and *Vladimir Haensel*, Chicago, Ill. TREATMENT OF HYDROCARBONS. Patent dated Sept. 11, 1945. Disclaimer filed Dec. 7, 1949, by the assignee, *Universal Oil Products Company*.
Hereby enters this disclaimer to claim 1 of said patent.
[*Official Gazette January 17, 1950.*]